(No Model.) 3 Sheets—Sheet 1.

W. H. HOLSCLAW.
COTTON SEED PLANTER.

No. 435,749. Patented Sept. 2, 1890.

ATTEST:

INVENTOR:
W. H. Holsclaw
By J. N. McIntire
Attorney (No Model.) 3 Sheets—Sheet 2.

W. H. HOLSCLAW.
COTTON SEED PLANTER.

No. 435,749. Patented Sept. 2, 1890.

ATTEST:
J. A. Hurdle
G. F. Couvey

INVENTOR:
W. H. Holsclaw
By
J. N. McIntire
Attorney (No Model.) 3 Sheets—Sheet 3.

W. H. HOLSCLAW.
COTTON SEED PLANTER.

No. 435,749. Patented Sept. 2, 1890.

ATTEST:
J. A. Hurdle
J. F. Conrey.

INVENTOR:
W. H. Holsclaw
By J. N. McIntire
attorney.

UNITED STATES PATENT OFFICE.

WILFORD H. HOLSCLAW, OF LOUISVILLE, KENTUCKY, ASSIGNOR TO B. F. AVERY & SONS, OF SAME PLACE.

COTTON-SEED PLANTER.

SPECIFICATION forming part of Letters Patent No. 435,749, dated September 2, 1890.

Application filed April 29, 1890. Serial No. 349,872. (No model.)

*To all whom it may concern:*

Be it known that I, WILFORD H. HOLSCLAW, of Louisville, in the county of Jefferson and State of Kentucky, have invented certain new and useful Improvements in Cotton-Seed Planters; and I do hereby declare that the following is a full, clear, and exact description of the same, reference being had to the accompanying drawings, forming part of this specification.

My invention relates to a type of seed-planter that is especially adapted to the purposes of planting cotton-seed by a forced feed in a continuous drill and in any desired quantity, but which may be employed, by the removal of some of its parts and the attachment of others differently constructed, to plant corn, peas, &c.; and my present improvements have for their object to provide for use a cotton-seed planter which shall be efficient in its operation, economic of manufacture, exceedingly durable, and easily managed by any field-hand of ordinary intelligence.

To this main end and object my invention may be said to consist in the novel structural features and combinations of devices which will be found hereinafter more fully described, and that will be more specifically pointed out and defined in the claims of this specification.

To enable those skilled in the art to which my invention relates to make and use machines containing either wholly or in part the novel features peculiar to my improved planter, I will now proceed to more fully describe the same, referring by letters to the accompanying drawings, which form part of this specification, and in which I have shown my invention carried into effect in that precise form of machine in which I have so far successfully practiced it, though as to some or all of the several novel features of construction the form of the machine may of course be more or less modified.

Figure 1:
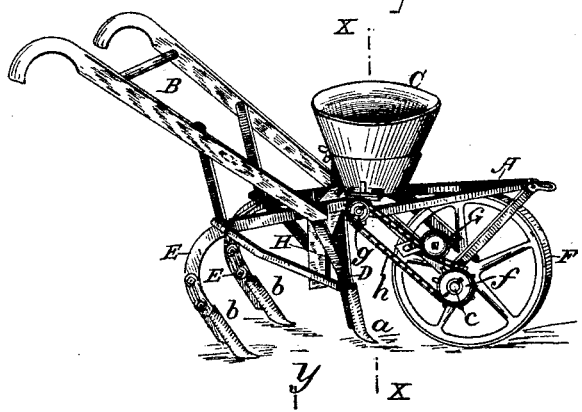
Figure 2:
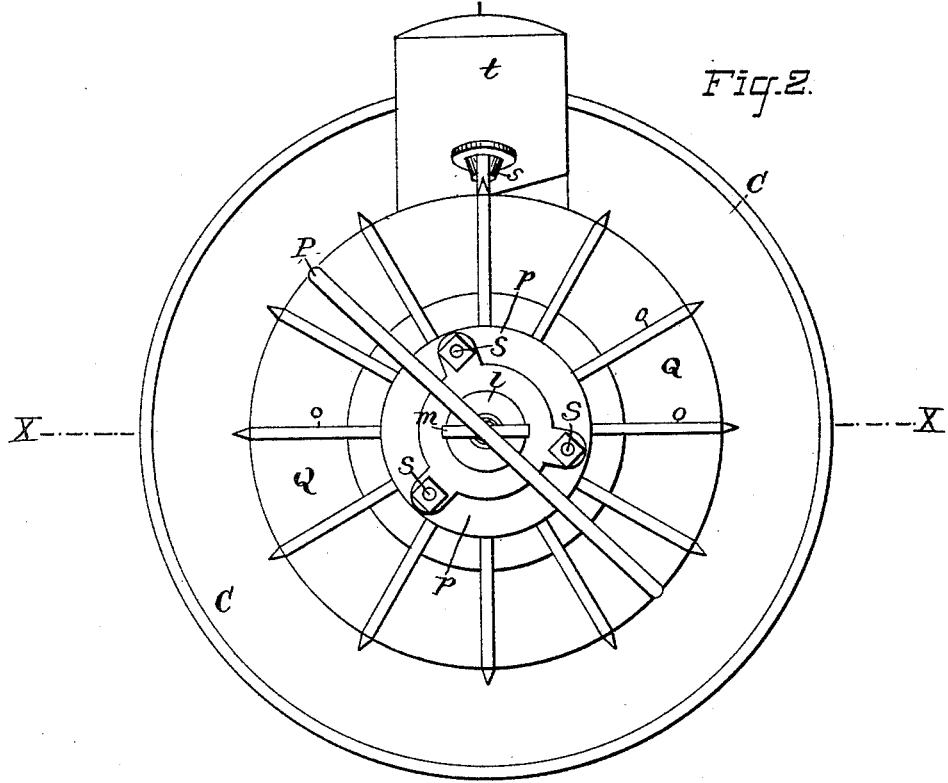
Figure 4:
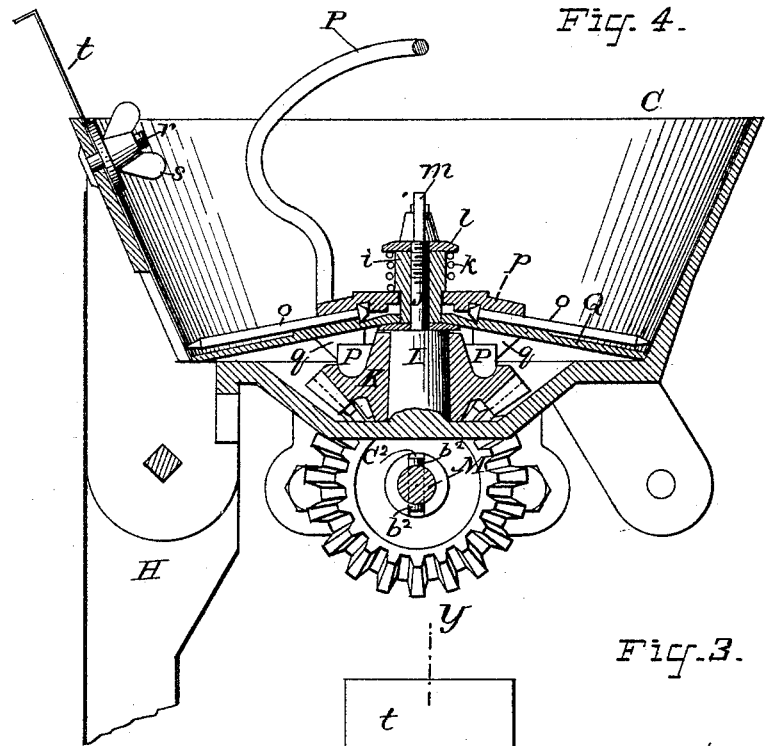
Figure 3:
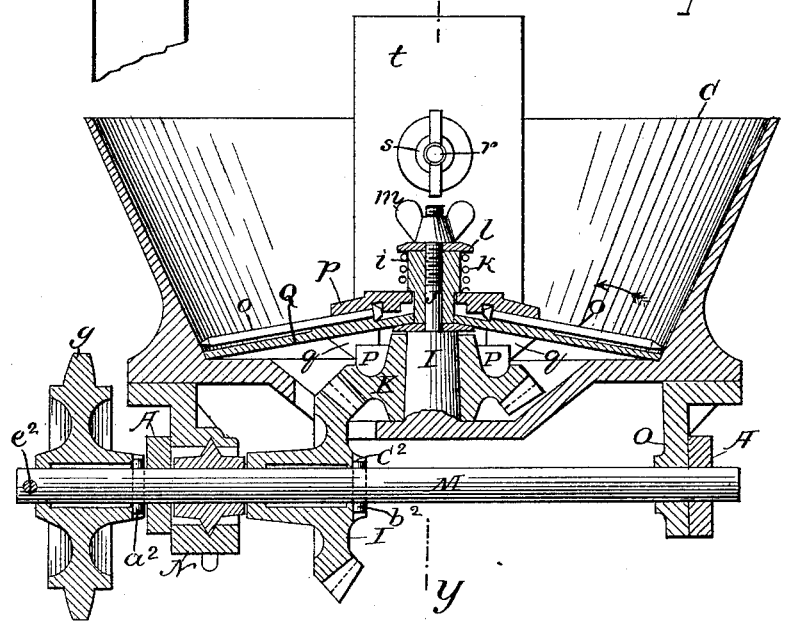
Figure 6:
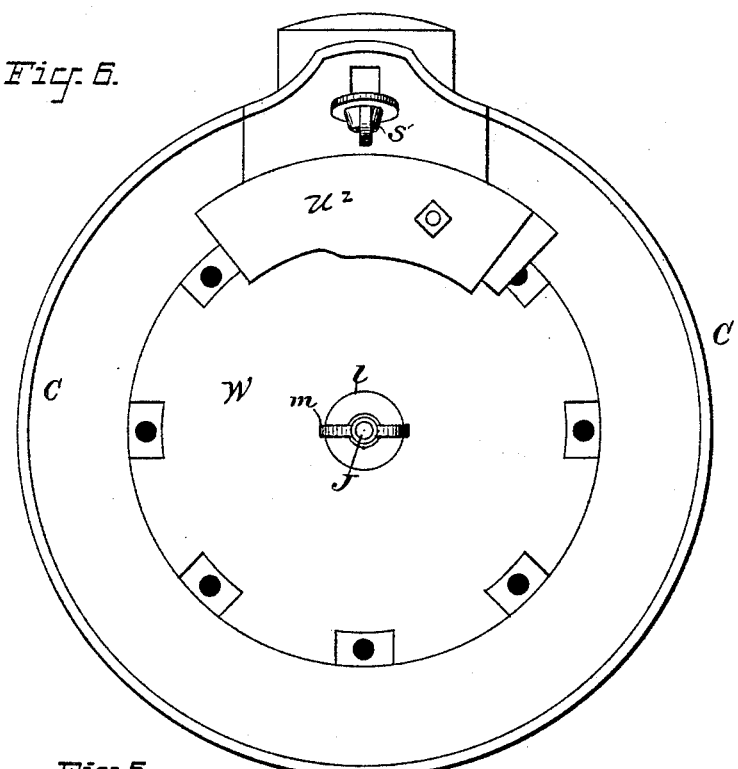
Figure 5:
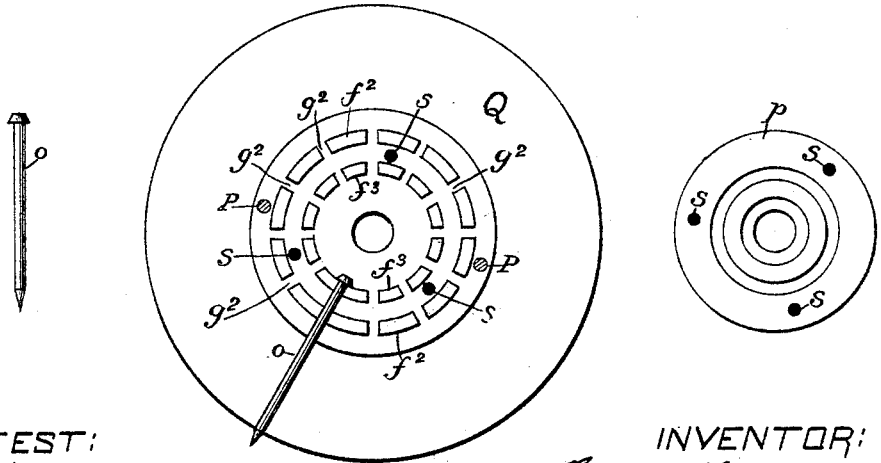

In the drawings, Figure 1 is a perspective view of the machine made according to my invention. Fig. 3 is a vertical cross-section of the same at the line *x x* of Fig. 1, with the drive-chain and frame-work removed to simplify the drawing. Fig. 2 is a top view of the hopper-like portion of the machine. Fig. 4 is a vertical section at the line *y y* of Fig. 3. Fig. 5 is a detail view showing separated from each other and from the other parts the rotatory planting-plate, one of its fingers, and the holder-plate between which and the planting-plate the fingers are clamped in place. Fig. 6 is a top view of the hopper and its working parts, but with some parts not shown in the other views added and with another form of planting-plate attached to transform the machine into a corn-planter.

In the several figures the same part will be found always designated by the same reference-letter.

A is the metallic frame, B the handles, and C the hopper, of the planter, the said frame A being formed or provided, preferably, in the manner shown, (see Fig. 1,) with a properly-braced metallic central standard D, on the lower end of which are mounted, as shown, the opener *a* and two rearwardly-arranged standards E E, which carry the covering-blades *b b*, all as clearly illustrated.

In the lower portion of the forward-depending portion of the metallic frame A is mounted in suitable bearings the shaft or axle *c* of the ground and drive wheel F, and fast on one (and an outwardly-projecting) end of said axle is mounted a sprocket-wheel *f*, from which is banded thence to the sprocket-pinion *g* an endless drive-chain *h*, through the medium of which the rotation of the wheel F, as the machine is drawn along over the ground, operates to drive the sprocket-wheel *g*, for a purpose to be presently explained.

For the purpose of adjusting the endless-chain belt *h* and keeping it in a proper working condition, the depending portion of the frame-work A, in which the drive-wheel F is mounted, is provided with a suitable tightener or adjustable idler G, that may be set to and be held fast in the requisite position, as clearly shown (see Fig. 1) in the drawings.

Communicating with the opening in or seed-exit at the lowermost rear portion of the hopper C is a chute H, which projects downwardly immediately in rear of the opener *a*, and through which the seeds descend, and from the lower open end of which they fall into the trench or opening in the ground made by the said opener, all in a manner familiar to those skilled in the art.

As shown, the metallic hopper C and the working parts secured thereto are mounted on the frame A and suitably fastened thereto, and these working parts are constructed and operated as I will now explain. The bottom of the hopper C is dish-shaped, or has a central frustuminally-shaped depression, from the middle of which rises an integrally-formed cylindrical teat I, which is preferably chilled in casting, and which has cast therein the upwardly-projecting screw-threaded stud or bolt J. The chilled teat I serves, as shown, as a journal on which turns a horizontal bevel-gear K, the lower end of the hub of which rests on the central depressed portion of the hopper-bottom, (see Fig. 2,) and the teeth of which face downward and engage with those of another bevel-gear L, that is mounted on the shaft M. The dishing or depressed bottom portion of the hopper is cast with an aperture through it at one side, as seen, and through this opening the uppermost part of the bevel-gear L passes, so as to run in engagement with the gear K.

The shaft M is mounted to turn freely in suitable bearings or boxes formed in the two depending portions or brackets N and O of the hopper, and it is to one end of this drive-shaft M that the sprocket-wheel $g$, before mentioned, is secured. Hence the rotation of said wheel $g$ by the means hereinbefore alluded to operates to turn the said shaft, and it in turn drives the gear L, which drives the horizontal gear K, located within the hopper. This gear K is formed or provided with a series (in the case shown two) of upwardly-projecting lugs P, which engage, in a manner and for a purpose to be presently explained, with the downward projections $q\ q$ of the rotatory planting-plate Q, which latter is made dish-shaped, in a direction opposite to that of the depressed portion of the hopper-bottom, and is arranged, as shown, so that the lower edge of its perimeter rotates in close proximity to the uppermost flat portion of the hopper-bottom. The said plate Q, with its convex shape, as shown, and the hopper-bottom, with its opposing central depression, form a sort of centrally-located receptacle or housing within which are located the gear K, with its lugs P, and the engaging-projections $q$ on the under side of said planting plate.

$i$ is a thimble, which is removably combined with the stud or screw-bolt J, and which sleeves or encircles the said stud and itself forms the arbor round about which turns the upper perforated middle portion of the plate Q, the said plate being held down in a working position yieldingly by the presser-spring $k$, which is coiled round the said thimble or sleeve $i$, with its lower end resting on the top surface of the convex portion of plate Q and its upper end held down by a collar or washer $l$, which in turn is held in place against the upward thrust of the said spiral spring by a thumb-nut $m$, screwed onto the upper end of the screw-stud J. The dish-shaped plate Q is cast or formed, as shown, (see Fig. 5,) with two concentric annular and upwardly-projecting flanges $f^2$ and $f^3$ on its top surface, which flanges have in them a series of notches $g^2$, the notches in the two flanges being arranged in line radially of the plate, as shown, and in these notches are seated or held (one in each pair of radially-arranged notches) the steel-wire nails $o$, or their equivalents, with their heads located just inside of and in contact with the inner circular wall of the flange $f^3$. As thus arranged, the series of steel nails $o$ have their sharpened ends projected slightly beyond the perimeter of the plate Q and their body portions lying in a plane slightly above the top surface of said plate, except at the locality at which they rest on said plate.

P is a bail-shaped agitator for stirring up the seed to prevent any packing of the same, and $p$ is a cap-plate or washer, which rests on top of the inner end portions of the devices $o$, and which when secured in place by means of the bolts and nuts $s$ in the manner shown operates to securely hold or clamp in place the said devices. The cap-plate $p$ is of course perforated with a hole of the same diameter as that in the middle of plate Q, and when the said cap-plate, the plate Q, and the devices $o$ are in their normal relative condition and secured therein by the screw-bolts $s$ these united parts form in the aggregate the planting-plate proper of the machine.

For the purpose of keying or holding properly in place on the shaft M the sprocket-wheel $g$ and the bevel-gear L, I have devised the following simple means, which I have found to answer well the purposes to be accomplished. The inner end of the hub of gear L is made with a radially-arranged slot or recess $C^2$ in it for the accommodation of a pin $b^2$, that is secured in a diametrical hole through the shaft M, (see Figs. 2 and 4,) and the outer end of said hub is lengthened out, so as to come into loose contact with the inner side of the depending bearing-box or hanger N, so that when held in place endwise the shaft M is effectually keyed or clutched to the hub of gear L. To hold the sprocket-wheel $g$ in place or clutch it to shaft M, a similar arrangement of recessed hub and another pin $a^2$ are employed, and to confine the parts relatively endwise on shaft M, and at the same time effect the retention in place (in the machine) of said shaft, the linch-pin or keying-pin $e^2$ is placed, as shown, in the hole made through shaft M, near one of its ends. It will be seen that by this construction or the combined arrangement of the parts, as shown, the bearing-box at N and the adjacent portion of the frame A of the machine are held in confinement endwise on the shaft M by being embraced and locked between the hubs of the wheels L and $g$, and that these wheels are in turn prevented from moving away from each other by the presence of the pins $a^2$ and $b^2$, that also serve to clutch these wheels to the rotatory shaft M. I deem this structural feature of the machine important, since it is exceedingly simple, durable, efficient, and economic of manufacture.

In the operation of the machine as so far described and as shown ready for use at Figs. 1 to 5, inclusive, of the drawings the cotton-seed to be sown are, as usual, supplied in sufficient quantity to the hopper C, and the machine then being drawn along over the field, as usual, under the management of the man who grasps the handles B, the rotation of the ground-wheel F will cause the axle or shaft $c$ to rotate the sprocket-wheel $f$, which, through the medium of the chain belt $h$, banded thence to the sprocket-wheel $g$, will drive the latter and thus rotate in the proper direction and at the requisite speed the shaft M. The rotation of said shaft operates through the medium of the bevel-gear L, keyed fast thereon to drive the bevel-gear K, and this gear, by means of its upwardly-projecting lugs P, rotates the planting-plate Q in the direction indicated by the arrow at Fig. 3. During the rotation of this disk-like plate Q, on top of which rests the mass of seeds in the hopper, the agitator P prevents any packing of the seed, and the rotating sharpened ends of the fingers $o$ operate to force and feed the seed properly through the seed-exit at the lower rear portion of the hopper, and by any desired or expedient variation that may be made in the number of fingers used the quantity forced or fed out may be varied or regulated.

By the combination of the housed or inclosed gear K (provided with the actuating-lugs P) with the rotatory plate Q, formed with lugs $q$ and a drive-gear L, working through an aperture in the depressed portion of the hopper-bottom, all as shown, a simple, compact, and efficient form of machine is produced in which there is no liability of any interference with the free movements of any of the working parts by the contents of the hopper, and by having the gear K mounted to revolve on the chilled post-like journal I the internal gear system is made capable of working perfectly and durably.

The arrangement of the drive-chain $h$ and its engaging sprocket-wheels is such, it will be seen, that there is no liability of any clogging up of the driving mechanism of the machine by any trash which may be lifted or thrown up by the movements of the ground-wheel F, and, all the movements of the working parts being continuous and rotatory, none of the parts are subjected to any shocking strains or wear, so that they may be all made comparatively light and cheap, and yet be perfectly efficient and durable. By simply transposing the two sprocket-wheels the speed of the planting-plate may be varied as desired.

My improved machine may easily have applied to it a suitable fertilizer attachment, by means of which the fertilizing material may be distributed simultaneously with the planting operation. The opener $a$ is of course adjustable, so that the depth of the planting may be regulated as may be desired, and, as clearly shown, the various necessary adjustments of the different movable parts of the machine may be easily made correctly by any unskilled person.

To transform the machine shown in Figs. 1 to 5, inclusive, into a corn-seed planter, I have only to remove those parts which are not necessary and substitute for the fingered rotatory plate Q the planting-plate W and its attachments or accompanying devices. (Seen at Fig. 6.) This plate W, it will be understood, has its under side formed or provided with engaging devices similar to those marked $q$ on the plate Q of the other figures, so that it is rotated in the same direction and in like manner as plate Q; but, being provided with a series of vertical seed pockets or receptacles arranged near its perimeter, and being used in connection with a suitable cover-plate and brush attachment applied to the hopper, as seen at $U^2$, Fig. 6, said planting-plate operates to carry to and discharge into the upper end of the chute H successive charges of the corn, peas, or other analogous seed. This planting-plate and its accompanying attachments, being made the subject of claims as to its detail construction in another case filed simultaneously with this one, need not be further described herein.

Having now so fully explained the construction and operation of my machine that those skilled in the art can make and use the same, what I claim therein as new, and desire to secure by Letters Patent, is—

1. In a planter designed especially for planting cotton-seed, the combination, with a hopper having a dish-shaped bottom provided with an upwardly-projecting journal and a bevel-gear mounted on said journal and provided with engaging lugs P, of a convex plate Q, having lugs engaging with those of said gear and arranged to turn on the same axis of motion, and provided on top with a series of radially-arranged fingers which operate to feed the seed into and force them through the hopper seed-exit, all substantially as hereinbefore set forth.

2. In combination with the hopper and the fingered plate arranged to rotate therein, as specified, the bail-like agitator P, attached to and rotating with the said fingered plate, the whole arranged and operating together in substantially the manner and for the purpose hereinbefore described.

3. The combination, with the rotatory plate Q, formed with radially-arranged depressions or seats in its upper surface and a series of fingers $o$ seated therein, of a cap-plate or washer bolted to the plate Q and operating to confine in place the said fingers, all substantially as hereinbefore set forth.

4. In a seed-planter, the combination, with the shaft M, mounted to turn in bearings N and O, the drive-wheel $g$, mounted on one end of said shaft, and the drive-gear L, mounted inside of the depending bearing N, of clutching-pins $a^2$ and $b^2$ in the said shaft, engaging with depressions in the hubs of the said wheel and gear, and means for holding the hub of the wheel $g$ in place on said shaft, all in substantially the manner and for the purpose hereinbefore set forth.

In witness whereof I have hereunto set my hand this 21st day of April, 1890.

WILFORD H. HOLSCLAW.

In presence of—
C. H. ALLMOND,
N. B. JOHNSON.